United States Patent [19]
Kalberer et al.

[11] Patent Number: 5,558,300
[45] Date of Patent: Sep. 24, 1996

[54] ADAPTABLE AIRCRAFT AIRBAG PROTECTION APPARATUS AND METHOD

[75] Inventors: Robert C. Kalberer, Boulder; Dan Goor, Colorado Springs, both of Colo.

[73] Assignee: Flight Safety Systems, Inc., Boulder, Colo.

[21] Appl. No.: 383,424

[22] Filed: Feb. 2, 1995

[51] Int. Cl.⁶ .................................................. B64D 25/00
[52] U.S. Cl. .................. 244/121; 244/118.5; 280/730.1; 280/731
[58] Field of Search ...................... 244/220, 234, 244/121, 118.5; 280/728.1, 728 R, 728.2, 728.3, 729, 730.1, 730 R, 730.2, 731, 777, 743

[56] References Cited

U.S. PATENT DOCUMENTS

| | | | |
|---|---|---|---|
| 2,063,812 | 12/1936 | James | 244/234 |
| 2,836,078 | 5/1958 | Yonkers | 280/777 |
| 3,642,303 | 2/1972 | Irish et al. | 280/730.1 |
| 3,767,229 | 10/1973 | Cain | 280/743.1 |
| 3,819,204 | 6/1974 | Oka et al. | |
| 4,262,931 | 4/1981 | Strasser et al. | |
| 4,449,204 | 5/1984 | Shimada et al. | |
| 4,565,535 | 1/1986 | Tassy | 280/728.1 |
| 4,832,287 | 5/1989 | Werjefelt | 244/118.5 |
| 5,190,313 | 3/1993 | Hickling | |
| 5,301,902 | 4/1994 | Kalberer et al. | |
| 5,305,884 | 4/1994 | Apps et al. | |
| 5,322,322 | 6/1994 | Bark et al. | 280/728.1 |

FOREIGN PATENT DOCUMENTS 546210  7/1942  United Kingdom ................ 244/220

*Primary Examiner*—Andres Kashnikow
*Assistant Examiner*—Tien Dinh
*Attorney, Agent, or Firm*—F. A. Sirr; Earl C. Hancock; Holland & Hart LLP

[57] ABSTRACT

An aircraft airbag module and an energy or impact absorbing and shock reducing control yoke are disclosed, the airbag module using non toxic compressed gas to provide either pyrotechnic or non-pyrotechnic inflation of an airbag independent of other aircraft operational systems. An airbag with one or more sections, when inflated, provides pilot protection without physically engaging the aircraft's control yoke, thus affording the possibility of continued aircraft control by the pilot. The aircraft control yoke includes a mechanically keyed and physically compressible section, as well as padding, thus providing the pilot with additional impact protection with or without airbag deployment. The airbag is retractable or releasable mounted so as to allow the airbag to be manually or automatically removed from the airbag module after an airbag inflation/deflation cycle.

28 Claims, 3 Drawing Sheets

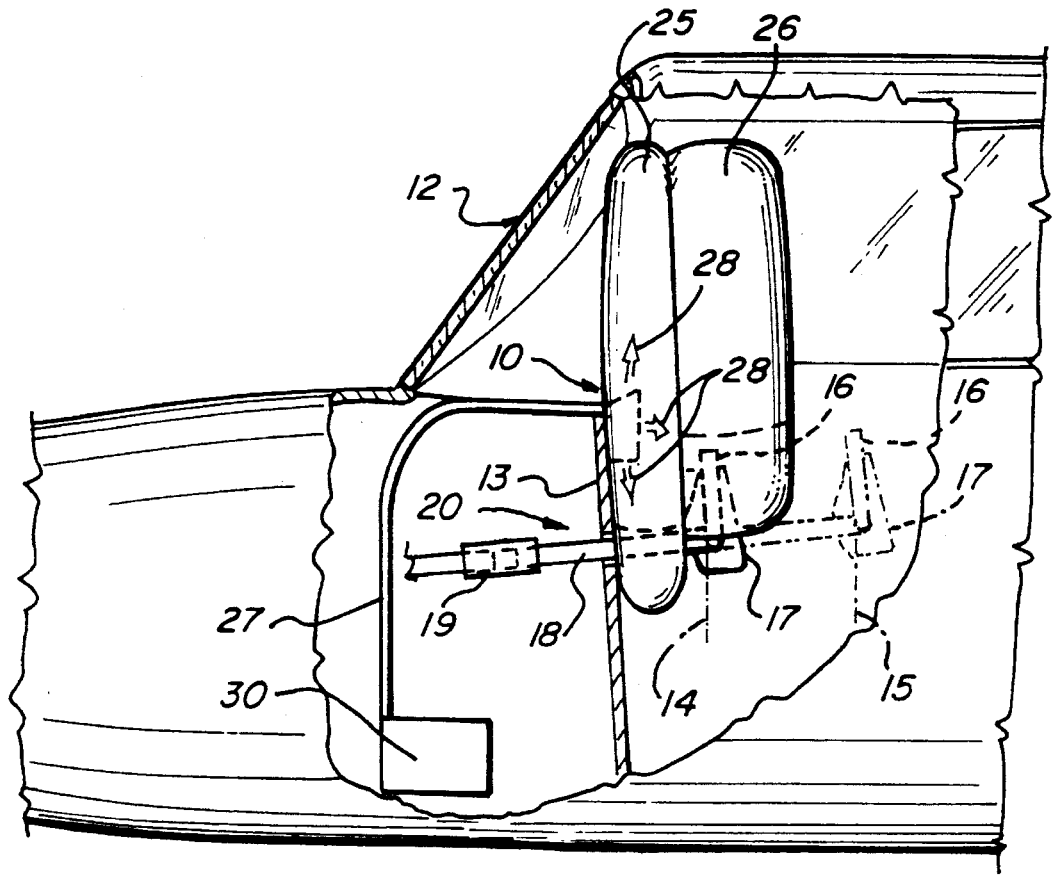
Fig_1
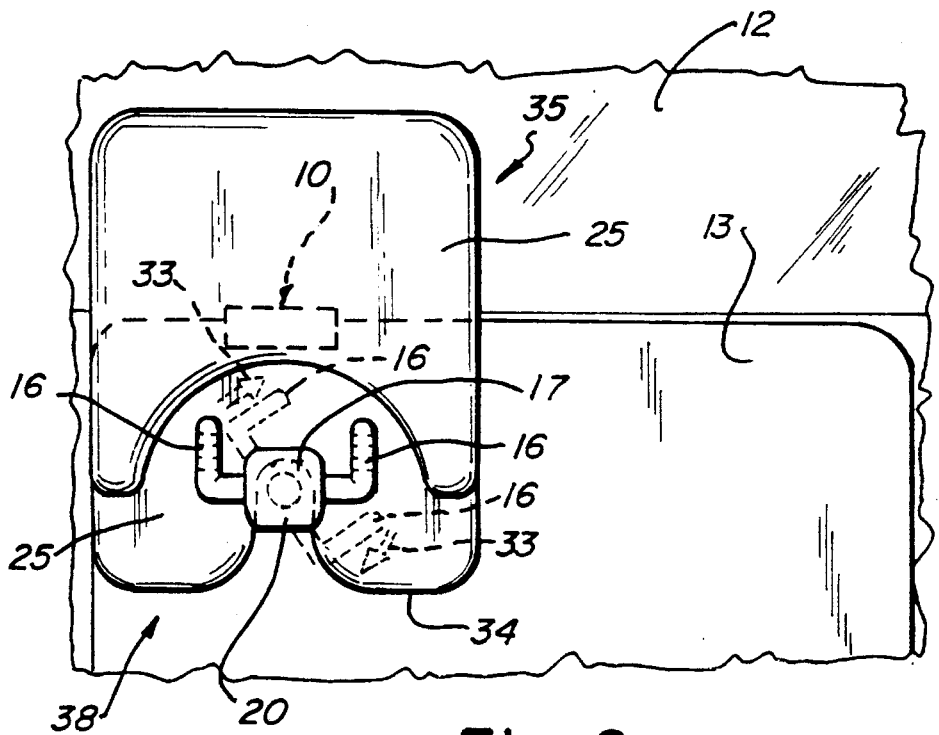
Fig_2

ADAPTABLE AIRCRAFT AIRBAG PROTECTION APPARATUS AND METHOD

CROSS-REFERENCE TO RELATED APPLICATIONS

The following three U.S. patent applications are incorporated herein by reference.

U.S. patent application Ser. No. 08/242,796 entitled Aircraft Control Yoke filed May 16, 1994.

U.S. patent application Ser. No. 08/242,936 entitled Aircraft Airbag Protection Apparatus and Method filed May 16, 1994.

U.S. patent application Ser. No. 08/287,386 entitled Adaptable Aircraft Airbag Protection Apparatus and Method filed Aug. 8, 1994.

BACKGROUND OF THE INVENTION

The present application is directed to apparatus and methods for minimizing the prospect for loss of control of an aircraft that has a control yoke assembly when an airbag expands to fill a space between the control yoke and an individual, thus the present application is a continuation in part of aforesaid U.S. patent application Ser. No. 08/287,386.

1. Field of the Invention

The present invention relates to devices and processes for improving the ability of an aircraft pilot/occupant to survive a crash. More particularly, the present invention relates to safety oriented apparatus and methods for employing airbags to increase the prospect of survival of an aircraft occupant despite a serious deceleration of the aircraft.

2. Description of the Related Art

The following two U.S. patents are incorporated herein by reference.

U.S. Pat. No. 5,301,902 entitled "Aircraft Airbag Protection Apparatus and Method".

U.S. Pat. No. 5,335,884 entitled "Adaptable Aircraft Airbag Protection Apparatus and Method".

Aircraft crashes often expose the occupants to serious or lethal injuries due to physical contact with instrument panel switches and instrumentation, as well as with the aircraft controls, in what could otherwise be a survivable accident. The incorporation of an airbag system in an aircraft provides a resilient protective barrier between the pilot and the instrument panel on the occasion of many common aircraft accidents. In order to provide for control of the aircraft during an unintended airbag inflation, the inflation size of the airbag in the proximity of the aircraft's control yoke must be limited.

An example of the use of an airbag in an aircraft is U.S. Pat. No. 5,190,313 wherein an airbag prevents operator contact with the sighting tube of a combat helicopter.

The use of airbags in land vehicles, such as automobiles, is well known and is exemplified by U.S. Pat. Nos. 3,819,204, 4,262,931 and 4,449,204.

While prior devices such as exemplified above are generally useful for their limited intended uses, the need remains in the art for the combination of a new, unusual and unconventional aircraft airbag shape and a new and unusual aircraft impact absorption control yoke, which structural elements work together and cooperate in a new and an unusual manner as a unitary system to provide a margin of protection that is greater than the margin of protection that would be provided by either individual structural element alone.

SUMMARY OF THE INVENTION

This invention provides the combination of a new, unusual and unconventional airbag shape and a new and unusual impact absorption control yoke, which structural elements work together and cooperate in a new and an unusual manner as a unitary system to provide a margin of protection that is greater than the margin of protection that would be provided by either structural element by itself. Although in general terms the broad concept of airbags in aircraft, and the broad concept of energy absorbing control yokes are not new per se, the combination and type that are provided by this invention does not appear in the art, and this combination provides for a more effective system.

The invention relates to a system that is independent of all other aircraft systems, that is all other aircraft operational systems, and that uses pyrotechnic or more preferably non pyrotechnic airbag inflation means. This independence from other aircraft systems makes the system of the invention well suited for retrofit into existing aircraft where the reliability of other aircraft systems that may be 20 years old, or older, could be in doubt.

As a feature of the invention, a source of inert compressed gas, such as nitrogen or other non-toxic gas, is provided for airbag inflation, and this source of compressed gas is activated by an independent aircraft acceleration/deceleration sensing system. While an automobile system is known wherein a compressed gas source is provided to activate an airbag independent of other auto systems, this prior automobile system has not been applied to the aviation art, which field of endeavor provides problems not found in the automobile art.

In accordance with the configuration of this invention, using non-pyrotechnic inflation, the absence of a pyrotechnic airbag inflation means enables the aircraft airbag to be very thin, thus allowing the stored airbag module (i.e., an uninflated airbag) to take up far less space on the aircraft instrument panel, thereby providing the pilot with a clear view outside the cockpit, as well as a clear view of the instrumentation that is contained on the instrument panel. As can be appreciated, when pyrotechnics are used for airbag inflation, particularly in a small aircraft cabin, any residual chemicals from pyrotechnic activity would be more noticeable since the aircraft cockpit has less cubic volume than the average automobile.

A feature of the invention locates the airbag module with foam padding support in such a way so as to provide additional protection to the occupant even under a condition when the airbag has not deployed, or during later additional aircraft impacts after the airbag has experienced an inflation/deflation cycle. By way of this construction and arrangement, the aircraft occupant at no time receives less protection than would be provided without installation of the system of the invention.

A further feature of the invention provides an airbag that is manually or automatically releasable from the airbag module, or is retractable therein, after an inflation/deflation cycle, so as to enable the pilot to continue control of the aircraft while scanning the instrument panel in an unobstructed manner, this feature having special utility when the airbag is unintentionally inflated.

The invention provides a system which upon inflation of the airbag(s) allows independent control of the aircraft's control yoke by not contacting any portion of the control yoke or the hands of the pilot. As will be apparent to those of skill in the art, the exact shape of such an airbag is not critical. All that is required within the spirit and scope of this invention is that the airbag be so shaped as to avoid physical contact in the vicinity of the control yoke and the occupant/pilot's hands when the airbag is inflated. The protection that is afforded by the airbag(s) of the invention can, if desired, be supplemented by the shock absorption capabilities of the control yoke, the thereby provide a wall of protection for the occupant/pilot. While the use of compressed gas is preferred, within the broad spirit and scope of the invention both the acceleration/deceleration sensing means and the airbag inflating means may be conventional.

In a preferred embodiment of the invention, the airbag comprised two shapes, as will be defined. However, within the broad spirit and scope of the invention a single airbag shape, or more than two airbag shapes, will suffice to avoid physical contact in the vicinity of the control yoke and the occupant/pilot's hands when the single or multiple airbag shape is inflated.

These and other feature, advantages and objects of the invention will be apparent to those of skill in the art upon reference to the following detailed description of the invention, which description makes reference to the drawing.

BRIEF DESCRIPTION OF THE DRAWING

FIG. 1 is a side view of an aircraft cockpit and a fully deployed air bag in accordance with the invention.

FIG. 2 is a pilot's side view of the fully deployed airbag of FIG. 1.

DESCRIPTION OF THE PREFERRED EMBODIMENTS

FIG. 1 is a side view of an aircraft cockpit and a fully deployed and inflated two-part air bag 25,26 in accordance with the invention.

Figure 5:
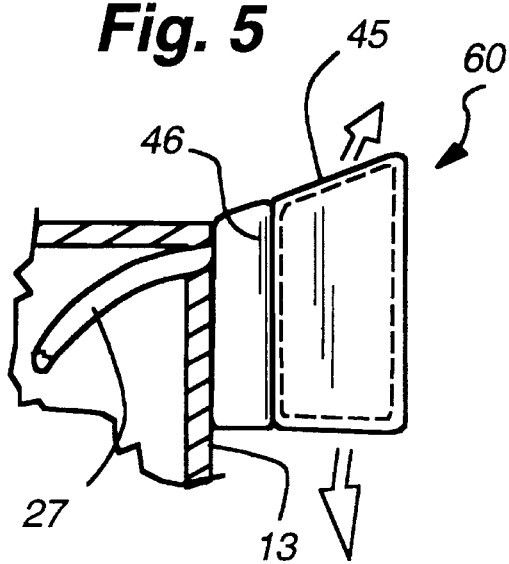
FIG. 5 is a side view of an uninflated airbag module in accordance with the invention.

Airbag module 10, another embodiment of which is shown in FIG. 5, is mounted vertically on top of aircraft instrument panel 13, so as to provide the pilot with unobstructed visibility through aircraft windshield 12, as well as unobstructed visibility of instrument panel 13, during normal flight of the aircraft. Airbag module 10 desirably includes an integral glareshield that is located above instrument panel 13, and uninflated airbag 25,26 is stored in module 10.

An aircraft's collapsible control yoke 20 in accordance with the invention is shown in its fully forward position identified by arrow 14 (aircraft nose pitched down), as well as in its dotted-line fully aft position identified by arrow 15 (aircraft nose pitched up). Collapsible control yoke 20 consists of basic four parts, a pair of horizontally spaced and generally vertically extending control yoke handles 16, generally vertically extending impact absorption padding 17, generally horizontally extending and cylindrical control yoke post 18, and compression-spring loaded impact/energy absorption mechanism 19 that forms a part of yoke post 18. Spring loaded impact/energy absorption mechanism 19 is designed in such a way as to compress only under significant force (i.e., a force to the left in FIG. 1) that may be associated with accident impact, such as pilot impact, and does not compress under the manual force that the pilot exerts on yoke handles 16 during normal flight.

Air bag module 10, when actuated, inflates a relatively large forward airbag portion 25 having a shape providing maximum coverage of instrument panel 13. Note that this large airbag size 25 is allowable since control yoke 20 does not move forward into the space occupied by airbag portion 25 even in the most forward position 14 of control yoke 20. Thus, airbag coverage of instrument panel 13 is maximized.

When airbag module 10 is actuated, a rear airbag portion 26 also inflates. Airbag portion 26 is shaped to avoid physical contact with control yoke post 18, as well as with the pilot's hands that are positioned on the two handles 16, yet airbag portion 26 provides protection for the pilot's head and upper chest area, and at the same time, protection is offered to the pilot's lower chest area by absorption padding 17 and by operation of spring loaded impact absorption mechanism 19.

This above-described new and unusual combination of airbag construction and control yoke construction provides a wall-like protective barrier for the pilot/occupant during many common aircraft accidents.

In accordance with a feature of the invention, inflation of airbag 25, 26 takes place upon the release of a compressed non-toxic gas, such as nitrogen or another non-toxic gas, via reinforced tubing 27, which tubing is preferably routed behind instrument panel 13. This construction allows for the bulk of the airbag inflation system to be installed in an area other than on instrument panel 13.

Three arrows 28 depict the three-dimensional direction of airbag inflation outward from module 10. An aircraft impact or acceleration/deceleration sensor of a type that is not critical to the spirit and scope of the invention, and a compressed gas cylinder of a type that is not critical to the spirit and scope of the invention are provided in module 30 that is affixed to the aircraft frame. As will be appreciated, module 30 is capable of responding to and registering aircraft shock pulses or impact.

It should be noted that within the spirit and scope of the invention, airbag module 10 and module 30 could comprise a single physical unit.

In an embodiment of the invention, airbag portion 25 was about 4 to 6 inches deep (depth being the dimension that extends generally parallel to yoke post 18), about 25-inches in vertical height and about 20 inches in horizontal width, whereas airbag portion 26 was about 6-inches deep, about 15-inches in vertical height and about 20-inches in horizontal width.

FIG. 2 is a pilot's side view of the fully deployed airbag 25, 26 of FIG. 1; i.e., view of airbag 25, 26 when looking from the pilot's seat toward windshield 12

Arrows 33 and the dotted line position of yoke handles 16 indicate maximum clockwise (CW) roll control position of control yoke 20, and show how independent aircraft control is allowed due to the shape of a deployed airbag 25, 26. As seen from FIG. 1, control yoke 20 in the full forward position 14 does not physically contact the lower section 38 of a deployed airbag 25, 26. The upper section 35 of the deployed airbag 25, 26 provides additional protection for the head and upper torso of the pilot/occupant, and this upper portion 35 of airbag 25, 26 extends horizontally further in a direction away from windshield 12 and toward the aircraft's pilot/occupant than does lower portion 38.

This new and unusual shape, construction, and arrangement of airbag 25, 26 allows pitch and roll control of the aircraft to occur by linear and rotational movement of control yoke 20, this movement being independent of physical engagement with any portion of deployed airbag 25, 26. Upper section 35 of airbag 25, 26 provides impact protection, along with the additional protection that is provided by impact/energy absorption means 17, 19 of control yoke 20 and by padding 17, so as to provide a wall-like barrier between the pilot/occupant, instrument panel 13, and windshield 12 during rapid aircraft deceleration.

Figure 3:
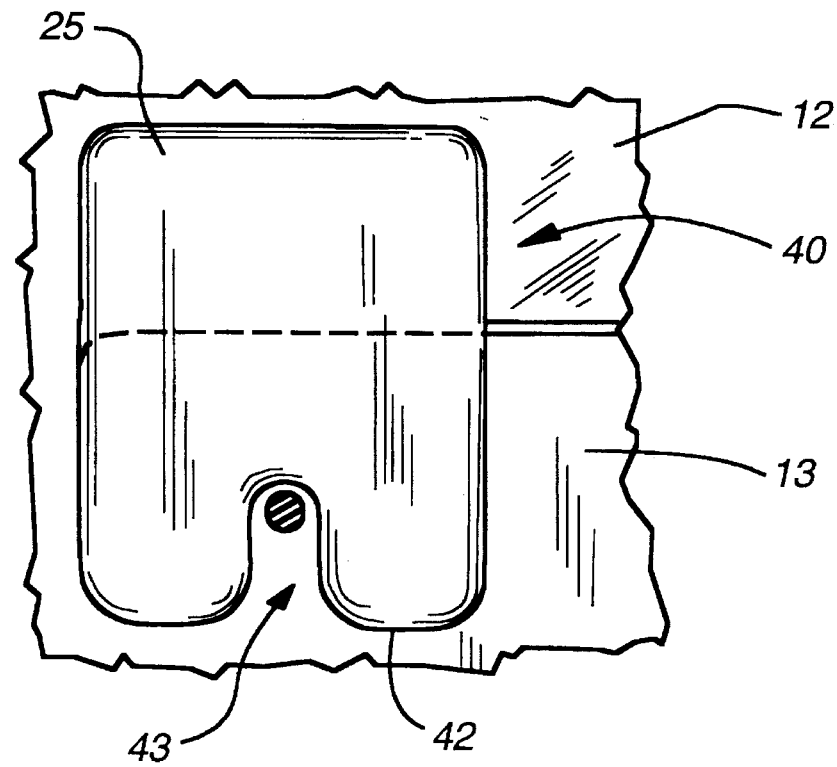
FIG. 3 is a view similar to FIG. 2 but showing only the front section or shape of the airbag of FIG. 1.

FIG. 3 is a view similar to FIG. 2, but shows only the front section or portion 25 of the two-section airbag 25, 26 that is shown in FIGS. 1 and 2; i.e., FIG. 3 depicts the approximately vertical-plane shape 40 of the deployed airbag portion 25 as it exists adjacent to instrument panel 13. Airbag portion 25 extends out and away from instrument panel 13 for several inches (for example, 6-inches) and stops short of physical contact with control yoke shaft 18, as can be seen. The lower horizontal surface 42 of airbag portion 25 is provided with a downward facing U-shaped notch 43 that operates to ensure that inflated airbag portion 25 does not physically contact control yoke post 18.

In an embodiment of the invention, notch 43 was about 1 to 4 inches in vertical height, and about 2 to 8 inches in horizontal width.

Figure 4:
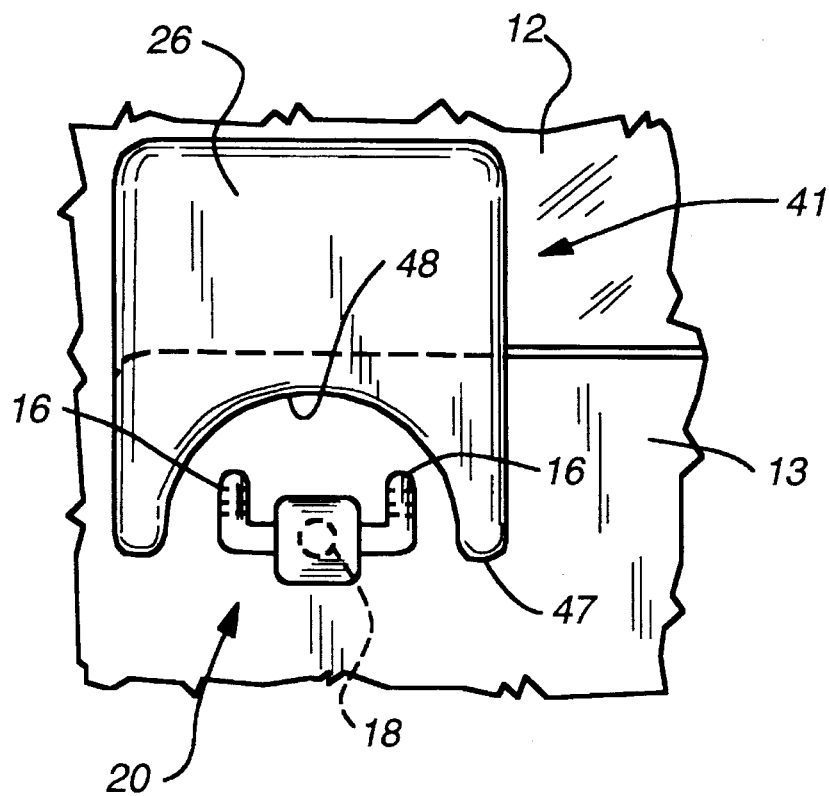
FIG. 4 is a view similar to FIG. 2 but showing only the rear section or shape of the airbag of FIG. 2.

FIG. 4 is a view similar to FIG. 3, but shows only the rear section or portion 26 of the two-section airbag 25, 26 that is shown in FIGS. 1 and 2; i.e., FIG. 4 depicts the approximately vertical-plane shape 41 of deployed airbag portion 26 as it exists adjacent to the pilot. Airbag portion 26 extends out and away from airbag portion 25 for several inches (for example, 6 inches), and stops short of physical contact with either control yoke post 18 or handles 16, as can be seen. The lower horizontal surface 47 of airbag portion 26 is provided with a downward facing semi-circular shaped notch 48 that operates to ensure that inflated airbag portion 26 does not physically contact either control yoke post 18 or handles 16.

An alternate form of airbag that is within the spirit and scope of this invention comprises an airbag similar to airbag portion 26 that extends the entire distance from instrument panel 13 to the occupant/pilot.

In an embodiment of the invention, notch 48 was about 7 inches in diameter, its center of curvature being located at about the location of yoke post 18.

FIG. 5 is a side view of an unactuated airbag module 60 in accordance with the invention. Module 60 preferably includes a stored airbag section 45 of the type 25, 26 above discussed, and additionally includes an impact absorbing backing assembly 46. Non-toxic inflation gas enters module 60 through tubing 27 (also shown in FIG. 1), allowing the physical bulk of the impact sensing and bottled gas system 30 to be located elsewhere in the aircraft; for example, as shown in FIG. 1. Impact/energy absorbing backing 46 allows module 60 to provide additional protection for the pilot/occupant during an initial impact force cycle that may occur after airbag 25, 26 has been deployed, as well as providing more protection than previously available during impacts during which airbag 25, 26 is not inflated.

Figure 6:
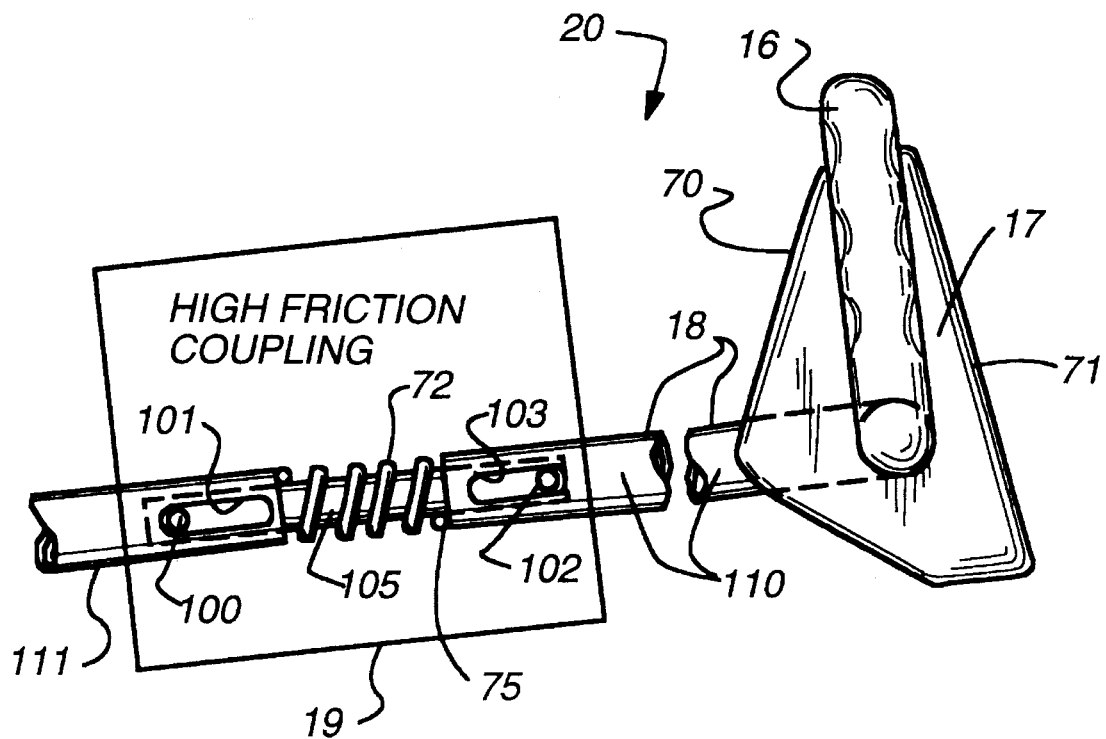
FIG. 6 is an enlarged side view of the control yoke of FIG. 1 showing in greater detail the collapsible construction of the control yoke.

FIG. 6 is an enlarged side view of control yoke 20 shown in the various figures, and shows in greater detail the collapsible construction 19 of control yoke shaft 18. FIG. 6 also shows pilot operable handles 16 and impact absorption padding 17. Control yoke padding 17 is designed in such a way as to reduce the force that is exerted on the pilot's chest by operating to spread this force over a larger surface area of the chest. As can be seen, padding 17 is somewhat conical in shape at the end 70 that is adjacent to instrument panel 13, to allow for better instrument visibility in spite of the large surface area 71 of padding 17 that faces the pilot's chest. Impact force is further dissipated by the spring-biased part 19 of control yoke post 18 that compresses toward instrument panel 13 as compression spring 72 is compressed toward instrument panel 13. In addition, spring-biased portion 19 of yoke shaft 18 is provided with a linear extending key 75 that allows post 18 to telescope, or collapse toward instrument panel 13. Key 75 operates to prevent post 18 from twisting about its generally horizontal axis, and thereby allows aircraft control to continue as the pilot uses handles 16 to control the aircraft after deployment of airbag 25, 26. Thus, although the yoke system of FIG. 6 provides additional protection when used with dual airbag system 25, 26, it also provides impact protection to the pilot when used alone.

In addition to the use of key 75 as above described, or as an alternate structure that does not use key 75, yoke shaft 18 is provided with a cylindrical stub section 105 that carries two radially extending metal pins 100, 102 that mate with slots 101, 103, respectively, slots 101, 102 being formed in front and rear portions 110, 111, respectively, of control yoke 18. This construction and arrangement also operates to prevent post 18 from twisting about its generally horizontal axis, and thereby allows aircraft control to continue as the pilot uses handles 16 to control the aircraft after deployment of airbag 25, 26.

Figure 7:
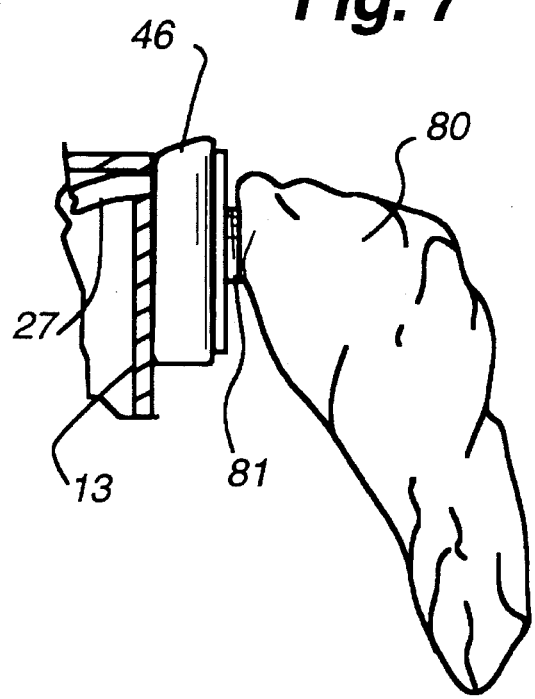
FIG. 7 is a view of the device of FIG. 5 showing an airbag that after has experienced an inflation/deflation cycle, FIG. 7 also showing the releasable/retractable mounting of the deflated airbag to the impact absorbing backing assembly by the use of a releasable mechanical connector.

FIG. 7 is a view of the device of FIG. 5 showing an airbag 80 that was stored within airbag section 45. In FIG. 7, airbag 80 has experienced an inflation/deflation cycle. As a feature of the invention, deflated airbag 80 is releasably mounted to impact/energy absorbing backing assembly 46 by way of a connector 81 of well known and noncritical design. As an alternative, and within the spirit and scope of the invention, deflated airbag 80 may be retractable; for example, into impact absorbing backing assembly 46. After such an airbag inflation/deflation cycle, if the pilot desires to continue controlled flight, airbag 80 may be manually or automatically removed from the vicinity of the control yoke by operation of connector 81, or the airbag may be retracted as described. By way of example, connector 81 may include a manually operable disconnect pin, or connector 81 may be operated by an automatic release means that is automatically actuated a period of time after such an inflation/deflation cycle, or a manual control button or the like may be provided to manually actuate the automatic release means. After airbag 80 has been thus removed, impact absorbing backing assembly 46 continues to afford protection to the pilot in the event that a subsequent deceleration force occurs.

The invention has been described while making detailed reference to preferred embodiments thereof. Since it is apparent that those skilled in the art will readily visualize yet other embodiments of the invention, this detailed description is not to be taken as a limitation on the spirit and scope of this invention.

What is claimed is:

1. An aircraft construction affording protection in the event of excessive aircraft acceleration/deceleration, comprising;

an elongated aircraft control yoke having a generally horizontally extending post, one end of said post movable penetrating an instrument panel, and an opposite end of said post containing generally vertically extending control handle means for operation by a pilot, said post being manually rotatable to enable control of aircraft roll, and said post being manually movable in a generally linear direction relative to said instrument panel to enable control of aircraft pitch, an aircraft windshield mounted relative to said instrument panel, an airbag assembly mounted on said instrument panel and generally vertically above said post and generally vertically below said windshield, an aircraft acceleration/deceleration sensor mounted on said aircraft, a source of compressed gas connected to be controlled by said sensor and connected to inflate said airbag assembly with said compressed gas, and said airbag assembly including an airbag which when inflated occupies a generally vertically flat and rectangular space between said control handle means, said windshield and said instrument panel, and above said post, without physically engaging said control handle means and said post, thus enabling said roll and pitch control of said aircraft in the presence of an inflated airbag.

2. The aircraft of claim 1 including;

releasable mechanical connector means mounting said airbag onto said airbag assembly, thus enabling selective removal or retraction of said airbag after said airbag experiences and airbag inflation/deflation cycle.

3. The aircraft of claim 2 including;

compressible spring means contained within said post, and linear key means extending along said post and associated with said spring means, said key means operating to allow compression of said post while maintaining rotation of said post.

4. In combination;

a generally vertically extending aircraft windshield, a generally vertically extending aircraft instrument panel located vertically under and to the rear of said windshield, a generally horizontally movable and rotatable control yoke having an elongated and generally cylindrical yoke post movable extending through a bottom portion of said instrument panel, said yoke post terminating at pilot control handles that are spaced to the rear of said instrument panel, an airbag module mounted in an unobstructing position relative to said instrument panel, at a location generally horizontally above said yoke post, and in a unobstructing position relative to said instrument panel and said windshield, said airbag module including a normally deflated airbag assembly, aircraft acceleration sensor means, a source of compressed gas connected to be actuated by said sensor means and operable when actuated to inflate said airbag assembly, said airbag assembly, when inflated, operating to occupy a physical space that is bounded by said windshield, said instrument panel, said yoke post, and said pilot control handles, and said airbag assembly, when inflated, being devoid of physical contact with said yoke post and said pilot control handles, said airbag assembly having a first relatively large, generally flat, vertical, and rectangular shape located adjacent to said windshield, said first shape when in an inflated state having a bottom portion that terminates at a location that does not physically contact said yoke shaft, and said airbag assembly having a second relatively small, generally flat, vertical, and rectangular shape located adjacent to said pilot control handles, said second shape when in an inflated state having a bottom portion that terminates at a location generally above said yoke shaft.

5. The combination of claim 4 wherein said bottom portion of said first shape includes a notch that is spaced from and movably accommodates said yoke shaft, and wherein said bottom portion of said second shape includes a notch that is spaced from and movably accommodates said yoke shaft and said pilot control handles.

6. The combination of claim 5 including first impact/energy absorbing padding means mounted on said yoke post termination adjacent to said pilot control handles.

7. The combination of claim 6 wherein said airbag module is mounted relative to said top portion of said instrument panel by way of second impact/energy absorbing padding means, and including releasable or retractable mounting means mounting said airbag assembly to said second impact/energy absorbing padding means.

8. The combination of claim 7 wherein said yoke post includes a linearly compressible means that compresses under a force applied to said first padding means.

9. The combination of claim 4 wherein said yoke post includes a linearly compressible means that compresses under a force applied to said first padding means in a direction toward said instrument panel.

10. The combination of claim 9 wherein said bottom portion of said first shape includes a first upward facing notch that is spaced from and movably accommodates said yoke shaft, and wherein said bottom portion of said second shape includes a second upward facing notch that is spaced from and movably accommodates said yoke shaft and said pilot control handles.

11. The combination of claim 10 including impact/energy absorbing padding means mounted on said yoke post termination adjacent to said pilot control handles.

12. An airbag assemble adapted for retrofit an existing aircraft having a generally vertically extending aircraft instrument panel and a generally horizontally movable and rotatable control yoke having a linear yoke post that movably extends through a bottom portion of the instrument panel, the yoke post terminating at pilot control handles that are spaced to the rear of the instrument panel, the airbag assembly comprising;

a first module adapted to be mounted relative to the instrument panel in a unobstructing position, said first module including a normally deflated airbag assembly, a second module adapted to be mounted to the aircraft, said second module having aircraft acceleration sensor means and a source of compressed gas connected to be actuated by said sensor means, and said source of compressed gas being operable when actuated to inflate said airbag assembly, and said airbag assembly, when inflated, operating to occupy a physical space that is bounded by the instrument panel, the yoke post, and the pilot control handles, and said airbag assembly, when inflated, is devoid of physical contact with the yoke post and the pilot control handles.

13. The air assembly of claim 12 wherein;

said airbag assembly has a first relatively large, generally flat and rectangular airbag shape which when in an inflated state has a bottom portion that terminates at a location generally below and out of engagement with the yoke shaft, and said airbag assembly has a second relatively small, generally flat and rectangular airbag shape which when in an inflated state has a bottom portion that terminates at a location generally above the yoke shaft.

14. The airbag assembly of claim 13 wherein said bottom portion of said first airbag shape includes a notch that is spaced from and movably accommodates the yoke shaft, and wherein said bottom portion of said second airbag shape includes a notch that is spaced from and movably accommodates the yoke shaft and the pilot control handles.

15. The airbag assembly of claim 14 including energy absorbing padding means for mounting said first module relative to the top portion of the instrument panel, and including releasable/retractable mounting means mounting said first module to said impact absorbing padding means.

16. A method for retrofit an existing aircraft having a generally vertically extending aircraft instrument panel and a generally horizontally movable and rotatable control yoke having a linear yoke post that movable extends through a bottom portion of the instrument panel, the yoke post terminating at pilot control handles that are spaced to the rear of the instrument panel, comprising the steps of;

replacing the control yoke with a control yoke having an elongated and linear yoke post that movable extends through a bottom portion of the instrument panel, said yoke post terminating at pilot control handles that are spaced to the rear of the instrument panel, providing an airbag module to be mounted relative to a top portion of the instrument panel, at a location generally horizontally above the yoke post, and in a unobstructing position relative to the instrument panel, said airbag module including a normally deflated airbag assembly, providing aircraft acceleration sensor means, providing a source of gas connected to be actuated by said sensor means and operable when actuated to inflate said airbag assembly, said airbag assembly, when inflated, operating to occupy a physical space that is bounded by the instrument panel, said yoke post, and said pilot control handles, and said airbag assembly, when inflated, being devoid of physical contact with said yoke post and said pilot control handles.

17. The method of claim 16 wherein;

said airbag assembly having a first relatively large, generally flat and rectangular airbag shape, said first airbag shape when in an inflated state having a bottom portion that terminates at a location generally below and out of physical contact with said yoke shaft, and said airbag assembly having a second relatively small, generally flat and rectangular airbag shape, said second airbag shape when in an inflated state having a bottom portion that terminates at a location generally above said yoke shaft.

18. The method of claim 17 including the steps of;

providing a notch in said bottom portion of said first airbag shape at a location spaced from and movably accommodating said yoke shaft, and providing a notch in said bottom portion of said second airbag shape at a location spaced from and movably accommodating said yoke shaft and said pilot control handles.

19. The method of claim 18 including the step of;

providing first energy absorbing padding means on said yoke post termination adjacent to said pilot control handles.

20. The method of claim 19 including the steps of;

mounting said airbag module relative to the instrument panel by way of second energy absorbing padding means, and providing releasable/retractable mounting means mounting said airbag assembly to said second energy absorbing padding means.

21. The method of claim 20 including the step of;

providing said yoke post with compressible means that compresses under a force applied to said first padding means.

22. A method providing for a safety retrofit to an aircraft having a generally vertically extending aircraft instrument panel and a generally horizontally movable and rotatable control yoke having a linear yoke post that movably extends through a bottom portion of the instrument panel, the yoke post terminating at pilot control handles that are spaced to the rear of the instrument panel, comprising the steps of;

mounting a first module relative to a top portion of the instrument panel in a unobstructing position relative thereto, said first module including a two-piece, normally deflated, airbag assembly, and mounting a second module to the aircraft, said second module having aircraft acceleration sensor means and a source of compressed gas connected to be actuated by said sensor means, and said source of compressed gas being operable when actuated to inflate said two-piece airbag assembly, said two-piece airbag assembly, when inflated, operating to occupy a physical space that is bounded by the instrument panel, the yoke post, and the pilot control handles, said two-piece airbag assembly, when inflated, being devoid of physical contact with the yoke post and the pilot control handles, and said two-piece airbag assembly having a first relatively large, generally flat and rectangular airbag which when in an inflated state has a bottom portion that terminates at a location generally below the yoke shaft, and said two-piece airbag assembly having a second relatively small, generally flat and rectangular airbag which when in an inflated state has a bottom portion that terminates at a location generally above the yoke shaft.

23. The method of claim 22 including the step of;

providing a first notch in a bottom portion of said first airbag, said first notch being spaced from and movably accommodating the yoke shaft, and providing a second notch in a bottom portion of said second airbag, said second notch being is spaced from and movably accommodating the yoke shaft and the pilot control handles.

24. The method of claim 23 including the steps of;

providing energy absorbing padding means mounting said first module relative to the top portion of the instrument panel, and providing releasable mounting means mounting said first module to said energy absorbing padding means.

25. A method of providing energy absorbing protection to the occupant/pilot of an aircraft having a linearly movable and rotatable control yoke that extends outward from an instrument panel toward a seat to be occupied by the occupant/pilot, the control yoke terminating at handles to be manually grasped by the hands of the occupant/pilot, the method comprising the step of;

providing an airbag shape, which when inflated, protects the occupant/pilot while avoiding physical contact with either the control yoke or the handles, thus providing for control of the aircraft by the occupant/pilot after inflation of the airbag shape;

and providing aircraft acceleration/deceleration sensing means and airbag inflating means whose inflation is controlled by the sensing means.

26. The method of claim 25 including the steps of;

providing an airbag module that houses an airbag in an uninflated state, and mounting said airbag module to the aircraft in the vicinity of the control yoke using an energy absorbing support.

27. The method of claim 26 including the step of;

providing a control yoke having an energy absorption capability.

28. The method of claim 25 including the steps of;

providing an airbag that is releasable from the airbag module, or is retractable relative thereto, after an inflation/deflation cycle of the airbag.

* * * * *